United States Patent
Hogan

(10) Patent No.: US 11,174,772 B2
(45) Date of Patent: Nov. 16, 2021

(54) MITIGATION OF DIESEL EMISSION FLUID (DEF) DEPOSITION IN EXHAUST SYSTEM FOR ENGINE

(71) Applicant: Caterpillar Inc., Peoria, IL (US)

(72) Inventor: Keith D. Hogan, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/800,802

(22) Filed: Feb. 25, 2020

(65) Prior Publication Data
US 2021/0262372 A1 Aug. 26, 2021

(51) Int. Cl.
*F01N 3/20* (2006.01)

(52) U.S. Cl.
CPC ............ *F01N 3/208* (2013.01); *F01N 3/2066* (2013.01); *F01N 2610/02* (2013.01); *F01N 2610/10* (2013.01); *F01N 2610/1406* (2013.01); *F01N 2610/1453* (2013.01); *F01N 2900/12* (2013.01); *F01N 2900/1404* (2013.01); *F01N 2900/1811* (2013.01)

(58) Field of Classification Search
CPC .... F01N 3/208; F01N 3/2066; F01N 2610/10; F01N 2900/1811; F01N 2610/02; F01N 2610/1406; F01N 2900/12; F01N 2900/1404; F01N 2610/1453
See application file for complete search history.

(56) References Cited

U.S. PATENT DOCUMENTS

| 8,387,371 | B2 | 3/2013 | Zhang et al. |
| 8,459,013 | B2 | 6/2013 | Hosaka et al. |
| 9,308,475 | B2 | 4/2016 | Badeau et al. |
| 9,376,655 | B2 | 6/2016 | Larsen et al. |
| 9,376,950 | B2 | 6/2016 | Ogawa et al. |
| 9,468,875 | B2 | 10/2016 | Cassidy et al. |
| 10,202,886 | B1 | 2/2019 | Teslovich |
| 10,301,997 | B2 | 5/2019 | Rodatz et al. |
| 2007/0119153 | A1 | 5/2007 | Pierz et al. |
| 2011/0131958 | A1 | 6/2011 | Adelman et al. |
| 2017/0014739 | A1 | 1/2017 | Roesgen et al. |
| 2017/0189837 | A1 | 7/2017 | Herold et al. |
| 2017/0328745 | A1 | 11/2017 | Kruse et al. |
| 2018/0016957 | A1 | 1/2018 | Woods et al. |

(Continued)

FOREIGN PATENT DOCUMENTS

| CN | 112196647 | 1/2021 |
| KR | 20150142019 A | 12/2015 |

(Continued)

*Primary Examiner* — Brandon D Lee
(74) *Attorney, Agent, or Firm* — Brannon Sowers & Cracraft

(57) ABSTRACT

An exhaust system for an engine includes an exhaust conduit, a selective catalytic reduction (SCR) device in the exhaust conduit, and a diesel emission fluid (DEF) system. The diesel emission fluid system includes a DEF delivery controller structured to receive a condition signal indicative of a DEF deposition risk condition in the exhaust system, and to command an increased heat energy output of a preheater to preheat DEF to be admitted into the exhaust conduit, such that a temperature of the DEF is increased to a deposition-mitigation temperature. Related methodology and control logic is also disclosed.

19 Claims, 3 Drawing Sheets

(56) References Cited

U.S. PATENT DOCUMENTS

2018/0128143 A1* 5/2018 Umemoto .............. F01N 3/0814
2018/0230885 A1* 8/2018 Khaled ................. F01N 11/005
2020/0340380 A1* 10/2020 Sato ........................ F01N 9/00

FOREIGN PATENT DOCUMENTS

| KR | 20170057061 A | 5/2017 |
| KR | 20180023600 | 3/2018 |
| WO | 0021881 | 4/2000 |
| WO | 2008005829 A2 | 1/2008 |

* cited by examiner

MITIGATION OF DIESEL EMISSION FLUID (DEF) DEPOSITION IN EXHAUST SYSTEM FOR ENGINE

TECHNICAL FIELD

The present disclosure relates generally to an exhaust system for an internal combustion engine, and more particularly to a diesel emission fluid system that preheats diesel emission fluid to mitigate risk of formation of solid deposits.

BACKGROUND

The use of exhaust aftertreatment equipment in internal combustion engines has become almost universal in recent years. Combustion of a mixture containing fuel and air in combustion cylinders in an engine produces exhaust containing various constituents it is desirable to limit from discharging to the atmosphere. Regulatory requirements as to allowable discharge of oxides of nitrogen or "NOx" and particulate matter have been implemented in recent years that have motivated manufacturers to develop a wide range of technologies for trapping or chemically transforming such materials in engine exhaust.

One common exhaust aftertreatment technology catalytically reduces NOx to molecular nitrogen and water. A system that has gained widespread acceptance and commercial success is known as a selective catalytic reduction or "SCR" device. Proper functioning of SCR equipment requires introduction of a reductant into the stream of exhaust to be treated. The reductant is typically provided in a liquid form that is selectively injected directly into the exhaust stream at a location that is upstream of the SCR device. The proliferation of commercially available diesel emission fluid or "DEF" will be familiar to many.

Common DEF formulations are aqueous, and in some instances, especially where engines operate in conditions experiencing low ambient temperatures, DEF stored onboard can freeze solid. Various strategies have been proposed for heating DEF directly in an onboard storage tank, or in supply lines connecting to the exhaust system. Such heating of the DEF can enable the exhaust system to begin or continue injecting DEF where ambient conditions would otherwise present problems due to the DEF freezing solid.

Another example of DEF heating in an exhaust system is set forth in U.S. Patent Application Publication No. 2007/0119153 to Pierz et al. Pierz proposes a urea SCR system for enhancing aftertreatment applications. In Pierz et al., the SCR system has a conduit connecting a delivery pump to an injection nozzle for the urea, with a heating element positioned downstream of the pump to preheat aqueous urea to a superheated condition prior to injection into an exhaust stream. Apparently the superheated aqueous urea flashes instantaneously to vapor upon injection into the relatively cooler exhaust stream. While Pierz et al. may solve certain challenges, there is always room for alternative strategies as well as pursuit of different end goals of temperature manipulation of diesel emission fluid.

SUMMARY OF THE INVENTION

In one aspect, an exhaust system for an engine includes an exhaust conduit extending between an upstream end structured to receive exhaust produced by the engine, and a downstream end. The exhaust system also includes a selective catalytic reduction (SCR) device positioned in the exhaust conduit, and a diesel emission fluid (DEF) system. The DEF system includes a DEF admission valve connected to the exhaust conduit at a location that is upstream of the SCR, a preheater, a condition sensor, and a DEF delivery controller. The DEF delivery controller is coupled with the preheater and with the condition sensor, and structured to receive a condition signal produced by the condition sensor that is indicative of a DEF deposition risk condition in the exhaust system, and to command an increased heat energy output of the preheater based on the condition signal, such that a temperature of DEF to be admitted into the exhaust conduit is increased to a deposition-mitigation temperature.

In another aspect, a diesel emission fluid (DEF) system includes a DEF delivery controller structured to couple with a preheater, for preheating DEF for delivery into an exhaust conduit in the exhaust system, and with a condition sensor, for monitoring a DEF deposition risk condition in the exhaust system. The DEF delivery controller is further structured to receive a condition signal from the condition sensor indicative of a DEF deposition risk condition in the exhaust system, and to determine a deposition-mitigation temperature for DEF to be admitted into an exhaust conduit in the exhaust system, based on the condition signal. The DEF delivery controller is further structured to command an increased heat energy output of the preheater, such that a temperature of the DEF to be admitted into the exhaust conduit is increased to the deposition-mitigation temperature.

In still another aspect, a method of operating an exhaust system for an internal combustion engine includes producing a condition signal indicative of a diesel emission fluid (DEF) deposition risk condition in the exhaust system, and increasing a heat energy output of a preheater for DEF in a DEF system of the exhaust system based on the condition signal. The method further includes increasing a temperature of DEF in the DEF system to a deposition-mitigation temperature based on the increased heat energy output, and commanding admission of DEF increased in temperature to the deposition-mitigation temperature into an exhaust conduit in the exhaust system.

DETAILED DESCRIPTION

Figure 1:
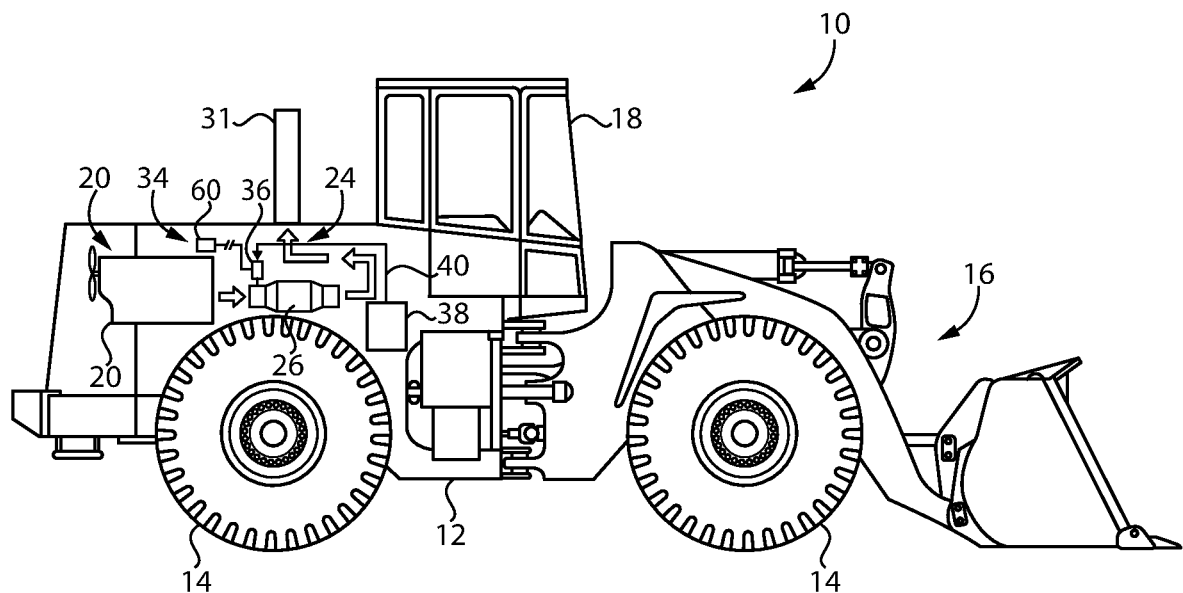
FIG. 1 is a side diagrammatic view of a machine, according to one embodiment.

Referring to FIG. 1, there is shown a machine 10 according to one embodiment and including a frame 12, ground-engaging propulsion elements 14 supporting frame 12, an implement system 16, and an operator cab 18. An internal combustion engine system 20 is supported upon frame 12 and includes an internal combustion engine 22. Machine 10 is shown in the context of a wheel loader, however, machine 10 could include any of a variety of other off-highway machines such as a tractor, a truck, a motor grader, a scraper, or still others. Machine 10 could also be an on-highway machine, or a stationary machine such as a pump, a compressor, or a generator set, to name a few examples. Internal combustion engine 20 may include a compression-ignition, multi-cylinder engine operating on any of a variety of suitable fuels such as a diesel distillate fuel, blends of hydrocarbon fuels, or still others. Internal combustion engine system 20 also includes an exhaust system 24 structured to feed exhaust from internal combustion engine 22 to an outlet such as an exhaust stack 31, a tailpipe, or the like. As will be further apparent from the following description, exhaust system 24 is uniquely configured for reduced emissions of certain exhaust constituents under a variety of conditions not possible or practicable with known strategies.

Figure 2:
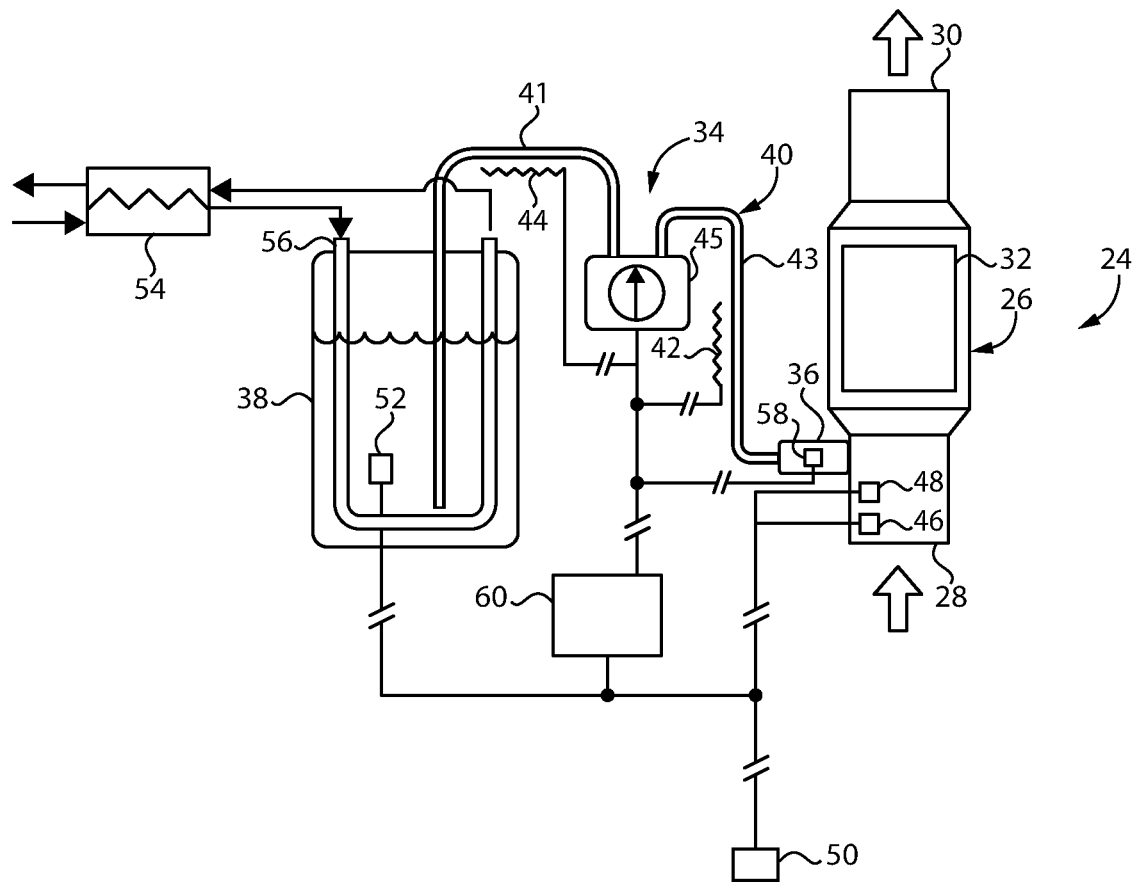
FIG. 2 is a diagrammatic view of an exhaust system, according to one embodiment.

Referring also now to FIG. 2, exhaust system 24 includes an exhaust conduit 26 extending between an upstream end 28 structured to receive exhaust produced by internal combustion engine 22, and a downstream end 30. Exhaust system 24 also includes a selective catalytic reduction (SCR) device 32 positioned in exhaust conduit 26. A variety of other exhaust aftertreatment devices including, but not limited to, a diesel particulate filter or "DPF", a diesel oxidation catalyst or "DOC", or still others can be positioned fluidly in exhaust system 24, between SCR device 32 and internal combustion engine 22, or between SCR device 32 and exhaust stack 31.

DEF system 34 includes a DEF admission valve 36, such as a DEF injection valve, connected to exhaust conduit 26 at a location that is upstream of SCR device 32. DEF system 34 also includes a DEF tank 38, a DEF supply line 40 extending between DEF tank 38 and DEF admission valve 36, and a DEF pressurization pump 45. DEF supply line 40 can include a lower pressure transfer line 41 extending into DEF tank 38 and fluidly connecting to pump 45, and a pressurized line 43 extending between pump 45 and DEF admission valve 36. Also shown in FIG. 2 is a radiator, or other heat exchanger 54, associated with a cooling system of internal combustion engine 22. In a practical implementation, engine coolant may be circulated between heat exchanger 54 and DEF tank 38 such as to thaw DEF stored in DEF tank 38 in a generally known manner. In some embodiments, a separate heater, such as an electrically resistive heater or the like, could be positioned in DEF tank 38 for analogous purposes.

DEF system 34 further includes a first preheater 42 and a second preheater 44. First preheater 42 may be positioned in heat transference contact with pressurized line 43, and second preheater 44 may be positioned in heat transference contact with transfer line 41. In some embodiments, only a single preheater might be used and associated with one of transfer line 41 or pressurized line 43. In a practical implementation, DEF system 34 includes at least one preheater structured to heat DEF relatively close to DEF admission valve 36, and thus in contact with pressurized line 43. As noted above, a heater or preheater can also be attached to, submerged in, or otherwise associated with DEF tank 38. Suitable preheaters can include electrically resistive preheaters deployed as heat tapes, heat wraps, radiative heaters, heated air blowers, or other arrangements in direct physical contact with or otherwise positioned to provide heat directly to parts of DEF supply line 40.

As discussed above, certain exhaust system strategies employ heaters to increase a temperature of DEF so as to prevent freezing or promote thawing in a DEF tank or in DEF supply lines, where frozen solid DEF would prevent or delay availability of an SCR device for exhaust emissions treatment. The various preheaters contemplated herein could be used for such purposes. The present disclosure also reflects the insight that preheaters can be used for other purposes, namely, to increase a temperature of DEF to be admitted into exhaust conduit 26 when internal combustion engine system 22 and exhaust system 24 are operating in such a way that formation and deposition of solid materials derived from DEF might otherwise occur.

To this end, DEF system 34 further includes a condition sensor, and typically a plurality of condition sensors 46, 48, 50, and 52, one or more of which are structured to produce a condition signal indicative of a DEF deposition risk condition in exhaust system 24. The condition sensors can include an exhaust temperature sensor 48 structured to produce an exhaust temperature signal, an exhaust mass flow sensor 46 structured to produce an exhaust mass flow signal, a DEF temperature sensor 52 structured to produce a DEF temperature signal indicative of a temperature of DEF stored in DEF tank 38, for example, or elsewhere in DEF system 34, and an ambient temperature sensor 50 structured to produce an ambient temperature signal 50. As further discussed herein, DEF controller 60 may receive and interpret signals from each of condition sensors 46, 48, 50, 52, and/or additional or alternative sensors, and controllably heat DEF to be admitted into exhaust conduit 26 in liquid form to mitigate the risk of deposition of DEF materials such as solid urea Also shown in FIG. 2 is an actuator 58 for DEF admission valve 36. DEF delivery controller 60 may be structured to operate actuator 58, which might include an electronically operated solenoid actuator, to inject DEF into exhaust conduit 26 for vaporization in the stream of exhaust gases conveyed toward and into SCR device 32. DEF delivery controller 60 is thus coupled with one or both of first preheater 42 and second preheater 44, and with one or more of condition sensors 46, 48, 50, 52, and structured to receive a condition signal produced by the one or more condition sensors that is indicative of a DEF deposition risk condition in exhaust system 26, and to command an increased heat energy output of first preheater 42 and/or second preheater 44, based upon the condition signal, such that a temperature of DEF in DEF supply line 40 to be admitted into exhaust conduit 26 is increased to a deposition-mitigation temperature.

In one implementation the condition signal includes an exhaust temperature signal, produced for example by exhaust temperature sensor 48 that is indicative of a reduction in exhaust temperature. It has been observed that while exhaust temperatures are relatively high during operating exhaust system 24 a risk of DEF deposition may be relatively low or nonexistent. DEF controller 60 may periodically, or more or less continuously, receive signals from, or interrogate, exhaust temperature sensor 48, to monitor exhaust temperatures in exhaust conduit 26. The exhaust temperature signal produced by exhaust temperature signal 48 can indicate, relative to a prior exhaust temperature signal, for example, a reduction in exhaust temperature that is associated with a DEF deposition risk condition. In one example, a reduction in exhaust temperature from a higher temperature to an exhaust temperature of about 200° C. or less can indicate the occurrence of a DEF deposition risk condition.

Those skilled in the art will appreciate that many exhaust systems will turn off DEF delivery during relatively lower exhaust temperature conditions, and accept an associated NOx penalty. According to the present disclosure, the preheating of DEF can be implemented to enable operation of SCR device 32 with relatively lower exhaust temperatures and reduction or elimination of a NOx penalty. Accordingly, even at relatively lower exhaust temperatures, for example from about 150° C. to about 200° C., DEF delivery controller 60 can command actuating DEF admission valve 36 to admit DEF increased in temperature to a deposition-mitigation temperature into exhaust conduit 26 for continuously operating SCR device 32.

It should be understood that while various sensors are discussed herein and might be part of DEF system 34, some or potentially all of these sensors could be substituted with virtual sensors or alternative sensors. For example, rather than sensing exhaust mass flow directly using exhaust mass flow sensor 46, operation of internal combustion engine system 20 could be monitored to obtain an estimate of exhaust mass flow, such as by monitoring boost pressure, fueling amounts, engine load, engine speed, or potentially other factors. Exhaust temperature might also be determined, inferred, or estimated, by means other than directly sensing exhaust temperature, such as by sensing intake air temperature, in-cylinder temperature, or still other factors that will be apparent to those skilled in the art. It should also be understood that the term "about" should be understood herein to mean "generally" or "approximately," or otherwise consistent with an understanding of a person skilled in the art. For instance, "about 200° C." does not mean only precisely 200° C. within measurement error, but instead contemplates temperatures above or below 200° C., where SCR operation ordinarily becomes impractical, as would be appreciated by a person skilled in the art of engine aftertreatment.

Figure 3:
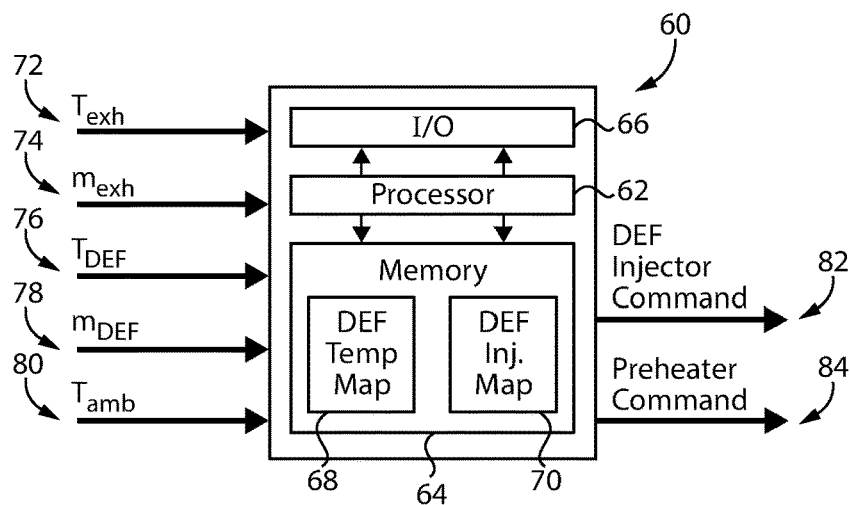
FIG. 3 is a functional diagram of a DEF delivery controller, according to one embodiment.

Referring also now to FIG. 3, there are shown additional details of DEF delivery controller 60. DEF delivery controller 60 can include a single dedicated control unit for DEF system 34, or multiple separate control units having distributed functions. In the illustrated embodiment, DEF controller 60 includes a processor 62, for example a microprocessor or microcontroller, coupled with a computer-readable memory 64 such as ROM, SDRAM, Flash, EPROMM, a hard drive, or still another. Memory 64 stores a DEF temperature map 68, and a DEF injection map 70, and can include other maps and operating software suitable for controlling one or more of the functions described herein of DEF system 34, or internal combustion engine system 10 generally. DEF delivery controller 60 also includes an input/output or I/O interface 66. A plurality of inputs are shown received by, or determined upon, processor 62, including an exhaust temperature input 72 ($T_{exh}$), an exhaust mass flow input 74 ($m_{exh}$), a DEF temperature input 76 ($T_{DEF}$), a DEF dosing input 78 ($m_{DEF}$), and an ambient temperature input 80 ($T_{amb}$). FIG. 3 also depicts outputs produced by DEF delivery controller 60 including a DEF injector command 82, such as an electrical current command for actuator 58, and a preheater command 84 such as an electrical current or voltage command, an on-time command, a temperature command, a turn-on command, or still another, for first preheater 42. As discussed above, a condition sensor in DEF system 34 can be one of a plurality of condition sensors structured to produce a plurality of condition signals, which may be represented by inputs 72-80. DEF delivery controller 60 may be further structured to determine the deposition-mitigation temperature based on the plurality of condition signals, as further discussed herein.

Figure 4:
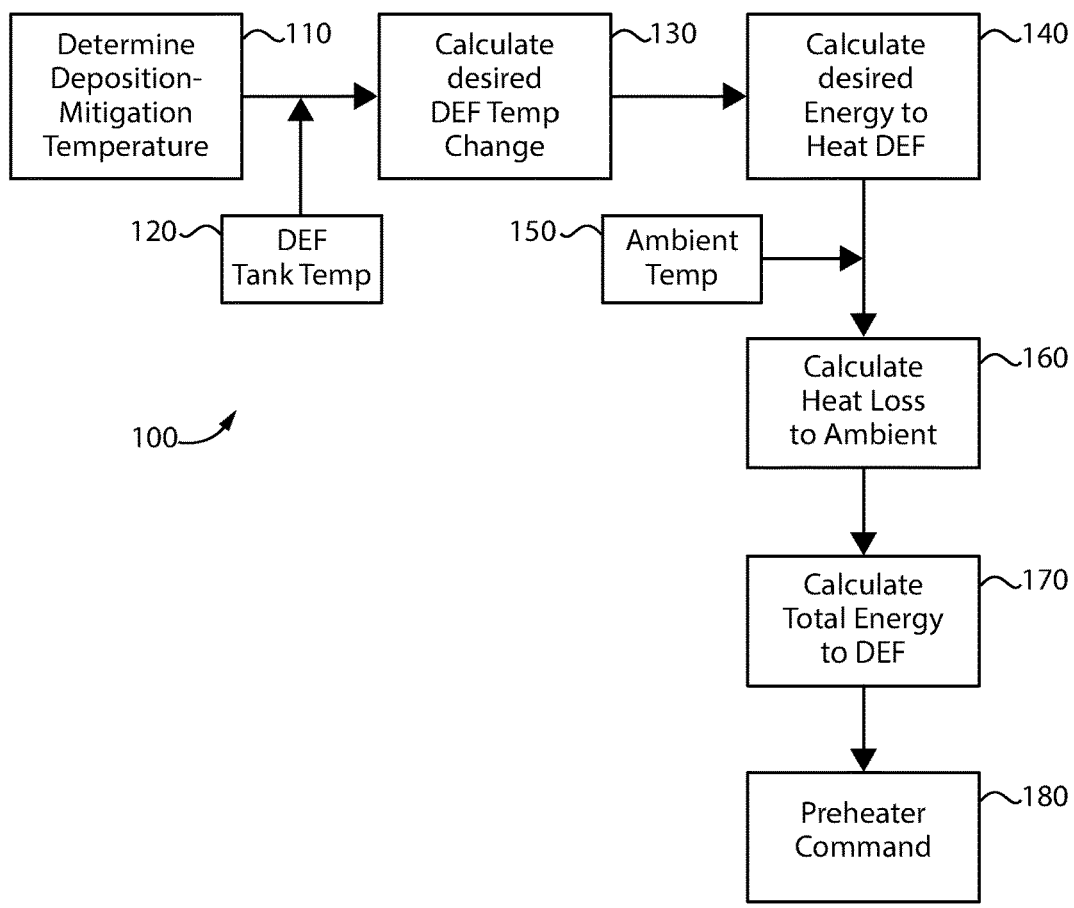
FIG. 4 is a computational block diagram, according to one embodiment.

Referring also now to FIG. 4, there is shown a computational block diagram 100 according to one embodiment. DEF delivery controller 60 may be further structured to look up the deposition-mitigation temperature in a map having an exhaust temperature coordinate, an exhaust flow coordinate, and a DEF dosing (amount) coordinate. In FIG. 4, a block 110 includes determining the deposition-mitigation temperature. In some instances, a relatively lower exhaust temperature could justify a relatively higher deposition-mitigation temperature, whereas a relatively higher exhaust temperature could justify a relatively lower deposition-mitigation temperature. A relatively higher exhaust mass flow might justify a relatively lower deposition-mitigation temperature, and a relatively higher exhaust mass flow might justify a relatively lower deposition-mitigation temperature. Exhaust temperature, exhaust mass flow, and DEF dosing amount are factors that may be cross-coupled and non-linearly related, with respect to DEF deposition risk, and potentially vary from exhaust system to exhaust system.

DEF delivery controller 60 can look up, upon DEF temperature map 68, the desired deposition-mitigation temperature. Alternatively, DEF delivery controller 60 could determine the deposition-mitigation temperature by calculations. A DEF tank temperature input is shown at a block 120, and at a block 130 is shown a calculation of desired DEF temperature change or ΔDEF. At a block 140, DEF delivery controller 60 calculates a desired energy to heat the DEF to be admitted. At block 140 DEF delivery controller 60 can be understood to calculate a desired energy to heat the DEF, based for example on a specific heat of the DEF multiplied by a DEF flow rate, multiplied by the desired ΔDEF. At a block 150 is shown an ambient temperature input, and at a block 160 is shown calculation of heat loss to ambient. At a block 170 is shown a calculation of the total energy input to the DEF, and at a block 180 is shown a preheater command. DEF delivery controller 60 may be further understood as structured to calculate a preheater control value based on a difference between a present DEF temperature and the deposition-mitigation temperature. The preheater control value could include a numerical value serving as the basis for preheater command 84, for instance, determined by the calculation performed at block 130, the calculation performed at block 140, or the calculation performed at block 170. The preheater control value may also be calculated based upon an expected ambient heat loss, including based on the ambient temperature input at block 150.

INDUSTRIAL APPLICABILITY

Figure 5:
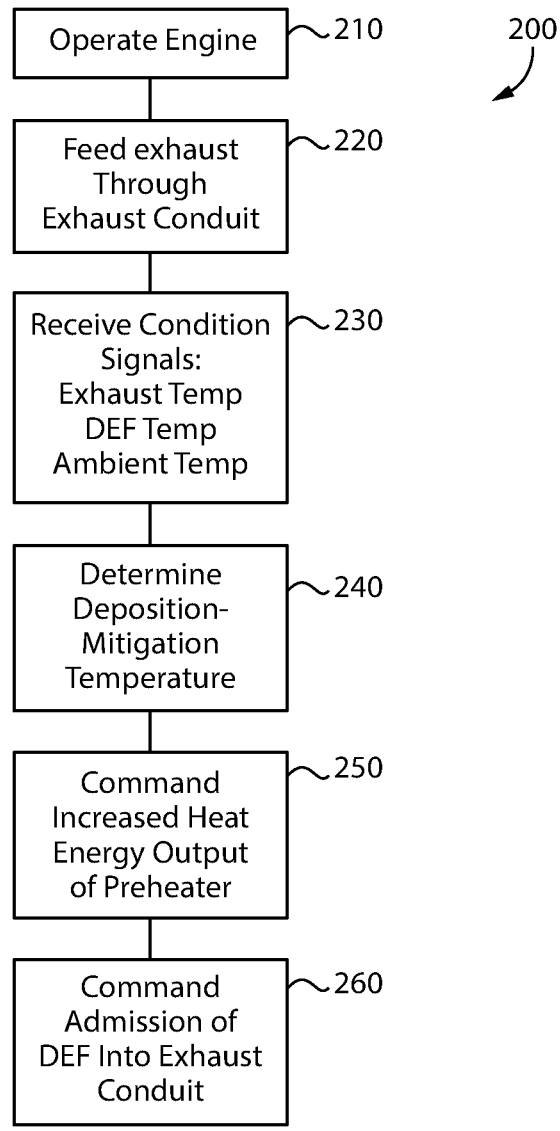
FIG. 5 is a flowchart illustrating example methodology and control logic flow, according to one embodiment.

Referring to the drawings generally, but also now to FIG. 5, there is shown a flowchart 200 illustrating example methodology and control logic flow according to the present disclosure. At a block 210, internal combustion engine system 20 is operated so as to operate internal combustion engine 22 and exhaust system 24. At a block 220, exhaust produced by internal combustion engine 22 is fed through exhaust conduit 26. From block 220, flowchart 200 advances to a block 230 to receive the condition signals, including an exhaust temperature signal, a DEF temperature signal, and an ambient temperature signal as discussed herein.

From block 230, flowchart 200 can advance to a block 240 to determine the deposition-mitigation temperature as discussed herein. From block 240, flowchart 200 advances to a block 250 to command the increased heat energy output of a preheater such as one of preheaters 42 and 44. Commanding the increased heat energy output may include commanding turning on one or both of preheaters 42 and 44, for example. From block 250, flowchart 200 advances to a block 260 to command admission of DEF into exhaust conduit 26. In some embodiments, the process and control logic of flowchart 200 could loop back and repeat more or less continuously while internal combustion engine system 20 is operating with DEF heating occurring to a greater or lesser extent to optimally control DEF temperature based on current conditions. In other instances, the control logic might be triggered only at certain conditions, such as where exhaust temperature is observed or inferred to drop below a threshold. Such threshold could be fixed, such as at about 200° C. as discussed herein, or variable taking account of several (or many) different factors internal or external to internal combustion engine system 20.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An exhaust system for an engine comprising:
    an exhaust conduit extending between an upstream end structured to receive exhaust produced by the engine, and a downstream end;
    a selective catalytic reduction (SCR) device positioned in the exhaust conduit;
    a diesel emission fluid (DEF) system including a DEF admission valve connected to the exhaust conduit at a location that is upstream of the SCR, a preheater, a condition sensor, and a DEF delivery controller;
    the DEF delivery controller is coupled with the preheater and with the condition sensor, and structured to:
        receive a condition signal produced by the condition sensor that is indicative of a DEF deposition risk condition in the exhaust system;
        command an increased heat energy output of the preheater based on the condition signal, such that a temperature of DEF to be admitted into the exhaust conduit is increased to a deposition-mitigation temperature; and
        determine the deposition-mitigation temperature based on a DEF dosing amount.

2. The exhaust system of claim 1 wherein the condition signal includes an exhaust temperature signal indicative of a reduction in exhaust temperature.

3. The exhaust system of claim 2 wherein:
    the DEF delivery controller is further structured to command actuating the DEF admission valve to admit DEF increased in temperature to the deposition-mitigation temperature into the exhaust conduit; and
    the reduction in exhaust temperature includes a reduction to an exhaust temperature of about 200° C. or less.

4. The exhaust system of claim 1 wherein:
    the condition sensor is one of a plurality of condition sensors structured to produce a plurality of condition signals; and
    the DEF delivery controller is further structured to determine the deposition-mitigation temperature based on the plurality of condition signals.

5. The exhaust system of claim 4 wherein the DEF delivery controller is further structured to look up the deposition-mitigation temperature in a map having an exhaust temperature coordinate, an exhaust flow coordinate, and a DEF dosing coordinate.

6. The exhaust system of claim 1 wherein the DEF delivery controller is further structured to:
    calculate a preheater control value based on a difference between a present DEF temperature and the deposition-mitigation temperature; and
    command the increased heat energy output of the preheater based upon the preheater control value.

7. The exhaust system of claim 6 wherein the DEF delivery controller is further structured to calculate the preheater control value based on an expected ambient heat loss.

8. A diesel emission fluid (DEF) system comprising:
    a DEF delivery controller structured to couple with a preheater, for preheating DEF for delivery into an exhaust conduit in the exhaust system, and with a condition sensor, for monitoring a DEF deposition risk condition in the exhaust system;
    the DEF delivery controller being further structured to:
        receive a condition signal from the condition sensor indicative of a DEF deposition risk condition in the exhaust system;
        determine a deposition-mitigation temperature for DEF to be admitted into an exhaust conduit in the exhaust system, based on the condition signal and a DEF dosing amount; and
        command an increased heat energy output of the preheater, such that a temperature of the DEF to be admitted into the exhaust conduit is increased to the deposition-mitigation temperature.

9. The DEF system of claim 8 wherein:
    the deposition risk condition includes a reduced exhaust temperature condition; and
    the DEF delivery controller is further structured to command the increased heat energy output of the preheater by commanding turning on the preheater.

10. The DEF system of claim 8 wherein the DEF delivery system includes the condition sensor, and wherein the condition sensor is an exhaust temperature sensor and the condition signal is an exhaust temperature signal.

11. The DEF system of claim 10 wherein the DEF delivery controller is further structured to:
    calculate a preheater control value based on a difference between a present DEF temperature and the deposition-mitigation temperature; and
    command the increased heat energy output of the preheater based upon the preheater control value.

12. The DEF system of claim 11 further comprising:
    a DEF tank temperature condition sensor structured to produce a DEF tank temperature signal;
    an ambient temperature condition sensor structured to produce an ambient temperature signal; and
    the DEF delivery controller is further structured to calculate the preheater control value based on the exhaust temperature signal, the DEF tank temperature signal, and the ambient temperature signal.

13. The DEF system of claim 10 wherein the DEF delivery controller is further structured to look up the deposition-mitigation temperature in a map having an exhaust temperature coordinate, an exhaust flow coordinate, and DEF dosing coordinate.

14. A method of operating an exhaust system for an internal combustion engine comprising:

producing a condition signal indicative of a diesel emission fluid (DEF) solids deposition risk in the exhaust system;

increasing a heat energy output of a preheater for DEF in a DEF system of the exhaust system based on the condition signal;

increasing a temperature of DEF in the DEF system to a deposition-mitigation temperature based on the increased heat energy output; and commanding admission of the DEF increased in temperature to the deposition-mitigation temperature into an exhaust conduit in the exhaust system.

15. The method of claim 14 wherein the producing of a condition signal includes producing an exhaust temperature signal indicative of a reduction in exhaust temperature.

16. The method of claim 15 wherein the increasing of the heat energy output of the preheater includes increasing the heat energy output by turning on the preheater.

17. The method of claim 15 further comprising determining the deposition-mitigation temperature based on exhaust temperature, exhaust flow, and DEF dosing.

18. The method of claim 14 further comprising calculating a preheater control value based on a difference between a present DEF temperature and the deposition-mitigation temperature.

19. The method of claim 18 wherein the calculating of the preheater control value further includes calculating the preheater control value based on an expected ambient heat loss.

* * * * *